(12) United States Patent (10) Patent No.: US 8,375,098 B2
Carro (45) Date of Patent: Feb. 12, 2013

(54) METHOD, SYSTEM AND PROGRAM PRODUCT FOR VERIFYING AN ATTACHMENT FILE WITHIN AN E-MAIL

(75) Inventor: Fernando Incertis Carro, Valencia (ES)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/073,287

(22) Filed: Mar. 28, 2011

(65) Prior Publication Data

US 2011/0173284 A1 Jul. 14, 2011

Related U.S. Application Data

(63) Continuation of application No. 12/145,702, filed on Jun. 25, 2008, now abandoned, which is a continuation of application No. 11/109,321, filed on Apr. 19, 2005, now Pat. No. 7,412,039.

(30) Foreign Application Priority Data

Apr. 23, 2004 (EP) ..................................... 04368034

(51) Int. Cl.
*G06F 15/16* (2006.01)
(52) U.S. Cl. .......................... 709/206; 709/218; 713/201
(58) Field of Classification Search .................... 709/206
See application file for complete search history.

(56) References Cited

U.S. PATENT DOCUMENTS

| | | | |
|---|---|---|---|
| 5,339,361 A | 8/1994 | Schwalm et al. | |
| 6,256,672 B1 * | 7/2001 | Redpath ........................ | 709/232 |
| 6,275,848 B1 | 8/2001 | Arnold | |
| 6,327,612 B1 | 12/2001 | Watanabe | |
| 6,353,823 B1 | 3/2002 | Kumar | |
| 6,505,236 B1 * | 1/2003 | Pollack ......................... | 709/206 |
| 6,529,871 B1 | 3/2003 | Kanevsky et al. | |
| 6,553,341 B1 | 4/2003 | Mullaly et al. | |
| 6,563,912 B1 | 5/2003 | Dorfman et al. | |
| 6,748,402 B1 | 6/2004 | Reeves et al. | |
| 6,990,514 B1 | 1/2006 | Dodrill et al. | |
| 7,409,710 B1 | 8/2008 | Uchil et al. | |
| 7,412,039 B2 | 8/2008 | Carro | |
| 7,574,744 B2 | 8/2009 | Eagle et al. | |
| 2001/0016874 A1 | 8/2001 | Ono et al. | |
| 2001/0054073 A1 | 12/2001 | Ruppert et al. | |
| 2002/0032752 A1 * | 3/2002 | Gold et al. .................... | 709/218 |
| 2002/0033961 A1 | 3/2002 | Murphy | |
| 2002/0046279 A1 | 4/2002 | Chung | |

(Continued)

OTHER PUBLICATIONS

Office Action (Mail Date Jul. 21, 2010) for U.S. Appl. No. 12/145,702, filed Jun. 25, 2008; Confirmation No. 3761.

(Continued)

*Primary Examiner* — Ashok Patel
*Assistant Examiner* — Andrew Goldberg
(74) *Attorney, Agent, or Firm* — Schmeiser, Olsen & Watts; Arthur J. Samodovitz

(57) ABSTRACT

System, method and program product for managing a file attached to an e-mail. The attached file's file name is obtained. A voice message file address is received and encoded into a modified address to comply with file naming rules of a recipient computer. A composite file name results from inserting the modified address into the attached file's file name and is displayed in the e-mail. The recipient computer extracts the modified address from the composite file name in the e-mail and decodes the modified address to obtain the voice message file address. Using the voice message file address, the recipient computer requests and receives the voice message file. The voice message is analyzed and verified prior to accessing the attached file. Verifying the voice message includes comparing a voice of the voice message to a voice signature.

18 Claims, 2 Drawing Sheets

U.S. PATENT DOCUMENTS

| | | | |
|---|---|---|---|
| 2002/0049853 A1 | 4/2002 | Chu et al. | |
| 2002/0091940 A1* | 7/2002 | Welborn et al. | 713/201 |
| 2002/0104026 A1 | 8/2002 | Barra et al. | |
| 2002/0120689 A1* | 8/2002 | Kang et al. | 709/206 |
| 2002/0194279 A1 | 12/2002 | Chern | |
| 2003/0065941 A1* | 4/2003 | Ballard et al. | 713/201 |
| 2003/0112978 A1 | 6/2003 | Rodman et al. | |
| 2003/0131083 A1 | 7/2003 | Inui et al. | |
| 2003/0135740 A1 | 7/2003 | Talmor et al. | |
| 2003/0140067 A1 | 7/2003 | Sesek et al. | |
| 2003/0140121 A1 | 7/2003 | Adams | |
| 2003/0142364 A1 | 7/2003 | Goldstone | |
| 2003/0143983 A1 | 7/2003 | Crampton | |
| 2003/0145209 A1 | 7/2003 | Eagle et al. | |
| 2003/0204569 A1 | 10/2003 | Andrews et al. | |
| 2003/0208546 A1 | 11/2003 | DeSalvo et al. | |
| 2003/0234953 A1 | 12/2003 | Dawson et al. | |
| 2004/0003260 A1 | 1/2004 | Hawkes et al. | |
| 2004/0015989 A1 | 1/2004 | Kaizu et al. | |
| 2004/0073795 A1 | 4/2004 | Jablon | |
| 2004/0088153 A1 | 5/2004 | Perrin et al. | |
| 2005/0044158 A1* | 2/2005 | Malik | 709/206 |
| 2005/0071434 A1 | 3/2005 | Hettish et al. | |
| 2005/0165721 A1 | 7/2005 | Inkinen | |
| 2005/0166052 A1 | 7/2005 | Khormaei et al. | |
| 2006/0044586 A1 | 3/2006 | Kujirai et al. | |

OTHER PUBLICATIONS

Oct. 20, 2011 Response filed for Office Action (Mail Date Jul. 21, 2010) for U.S. Appl. No. 12/145,702.

Final Office Action (Mail Date Dec. 29, 2010) for U.S. Appl. No. 12/145,702, filed Jun. 25, 2008; Confirmation No. 3761.

* cited by examiner

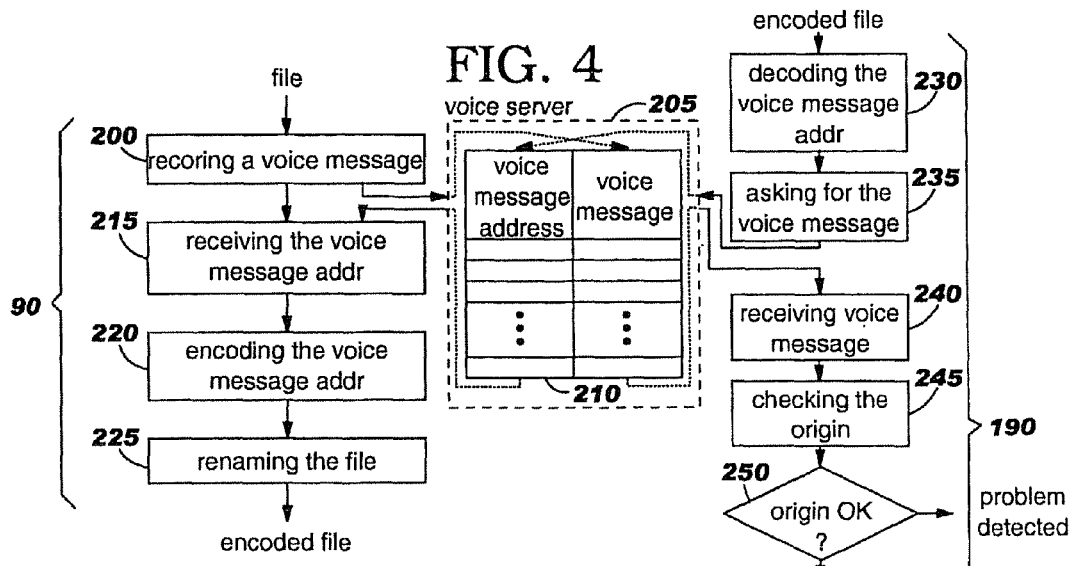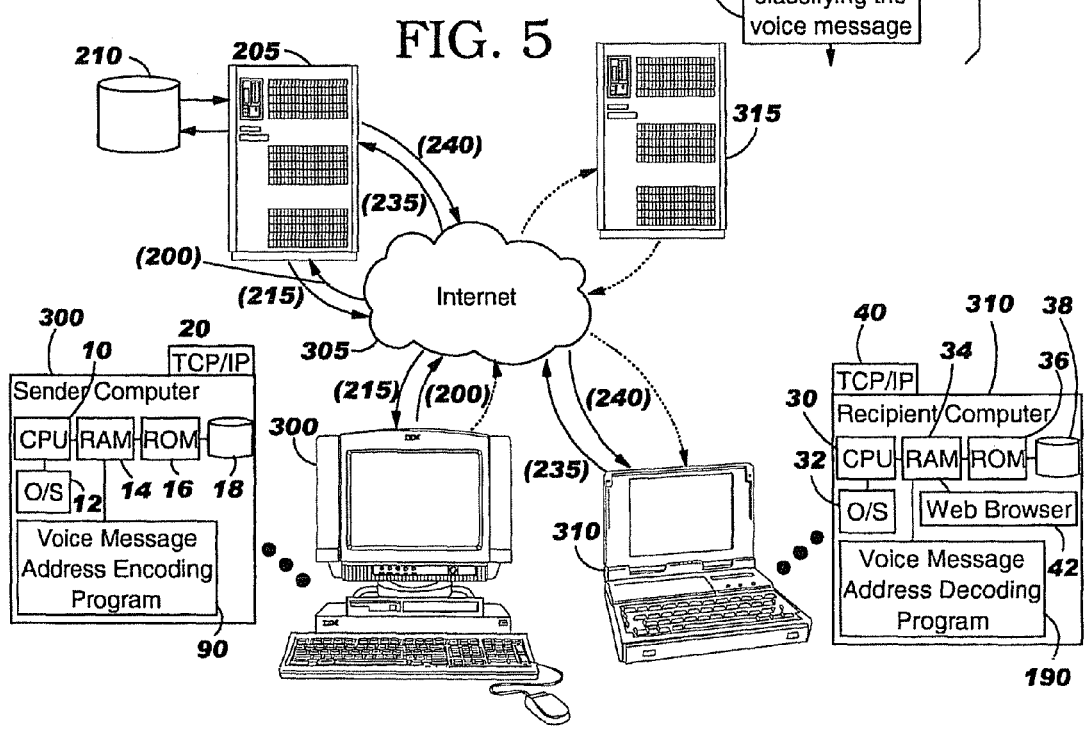

METHOD, SYSTEM AND PROGRAM PRODUCT FOR VERIFYING AN ATTACHMENT FILE WITHIN AN E-MAIL

This application is a continuation application claiming priority to Ser. No. 12/145,702, filed Jun. 25, 2008, now abandoned, which is a continuation of Ser. No. 11/109,321, filed Apr. 19, 2005, now U.S. Pat. No. 7,412,039, issued Aug. 12, 2008.

BACKGROUND OF THE INVENTION

The present invention relates generally to e-mail, and more specifically to a technique to verify authenticity of a file attached to an e-mail.

Electronic mail or "e-mail" is well known today. It is typically sent over the Internet, and received and displayed by a recipient's web browser. An e-mail may also include a file attachment. The file attachment is typically displayed as an icon with a name of file adjacent to the icon. If a recipient "clicks on" or otherwise selects the file icon, the recipient's web browser will fetch and open the file.

Many e-mails are unwanted "spam", i.e. unsolicited advertisements or messages. The spam e-mail may also include attachment files. The attachment file may contain unwanted or offensive text documents, graphics, pictures, audio, or video information.

A computer virus can also be embedded in a file attached to an e-mail. This is the most common method to "infect" the recipient's computer and other computers across a network. For example, a recipient may receive an e-mail with an attached, infected file including a computer program that can be executed within the recipient's computer system. When an infected file is opened, the computer program executes and may disrupt or incapacitate the recipient's computer by corrupting or deleting important programs and/or data files. While less prevalent in number than "spam", viruses are more disruptive and costly.

A computer virus, when executed at a recipient computer, may also access information contained in the recipient's address book. Then, the virus may mail a copy of itself as a file attached to an e-mail sent by the recipient, to everyone in the recipient's address book. In such a case, the infected file attachment may appear to originate from someone the (new) recipient knows and trusts. Because such files "apparently come" from a reliable source, the likelihood the infection will be spread by unwitting recipients is greatly increased. In those cases, the recipient may wish to ensure that attached or accessed files have been sent by a trustworthy sender rather than by a hacker, prior to exposing his or her computer system to an infected program file.

Known e-mail systems e.g., U.S. Pat. No. 6,553,341 entitled "Method and apparatus for announcing receipt of an electronic message", provide the capability to automatically read selected portions of an e-mail by using text-to-speech conversion.

An object of the invention is to provide to a recipient information describing content of a received file attachment, before the recipient opens and accesses the received file.

Another object of the invention is to enable a recipient to verify that a received file has been intentionally sent by a person and not automatically sent by a machine, before the recipient opens and accesses the received file.

Another object of the invention is to enable a recipient to verify the identity of the sender or the author of the received file, before the recipient opens the file.

SUMMARY OF THE INVENTION

The present invention resides in a system, method and program product for managing a file attached to an e-mail. Added to a file name of the attached file is an address or derivation of the address from which a voice message associated with the attached file can be accessed. The file name with the address are displayed in the e-mail adjacent to an icon for the attached file.

In accordance with features of the present invention, the address or derivation of the address can be merged with the file name. This merger can result from inserting the address in front of an extension dot of the file name. The derivation of the address may differ syntactically from the address from which the message can be accessed.

In accordance with another feature of the present invention, the voice message can describe a content of the file.

In accordance with another feature of the present invention, a voice of the voice message can be compared to a voice signature to determine authenticity of the voice message.

BRIEF DESCRIPTION OF THE DRAWINGS

FIG. 4 is a flowchart of the program of FIG. 1 to rename a file attached to an e-mail to include an address of an associated voice message, and a program within the recipient's computer to fetch and play the voice message.

FIG. 5 illustrates a distributed computer system or computing environment in which the present invention can be implemented and used.

DETAILED DESCRIPTION OF THE PREFERRED EMBODIMENTS

According to the present invention, an address of an audio file that describes the content of a text, image or other type of file attached to an e-mail is merged with an original name of the attached file. The address of the audio file can be its URL or other address. The audio record can be used to learn the general subject or content of the attached file and verify the origin or author of the attached file before the attached file is opened. When merging the address of the audio file with the original name of the attached file, the address of the audio file may be modified in form to avoid syntax, characters or symbols that are forbidden by the nomenclature of the file system naming rules. For example, the symbol "\" is not permitted in the naming rules for files supported by the Microsoft Windows operating system. ("Windows" is a Trademark of Microsoft Corporation). The address of the audio file may also be modified to reduce its length when needed to comply with the file system naming rules. Addresses to be encoded may be of any forms e.g., local addresses, addresses in private networks or Internet addresses. However, for sake of illustration, the examples given in the following description are based on URL type of addresses. The address of the voice message can be merged with the original file name regardless of whether the file is a type to be transmitted from a server to a user device or a type to be locally saved or transmitted to another system.

Figure 1:
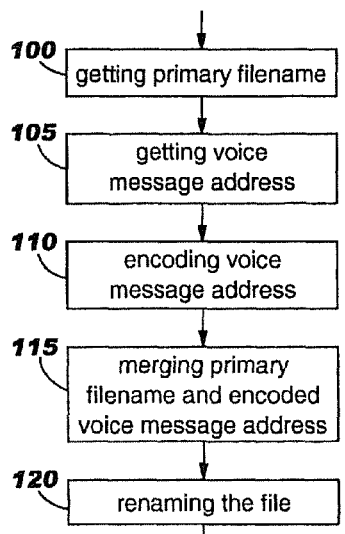
FIG. 1 is a flowchart of a program which renames a file attached to an e-mail, according to the present invention, to include an address of an associated voice message.
Figure 2:
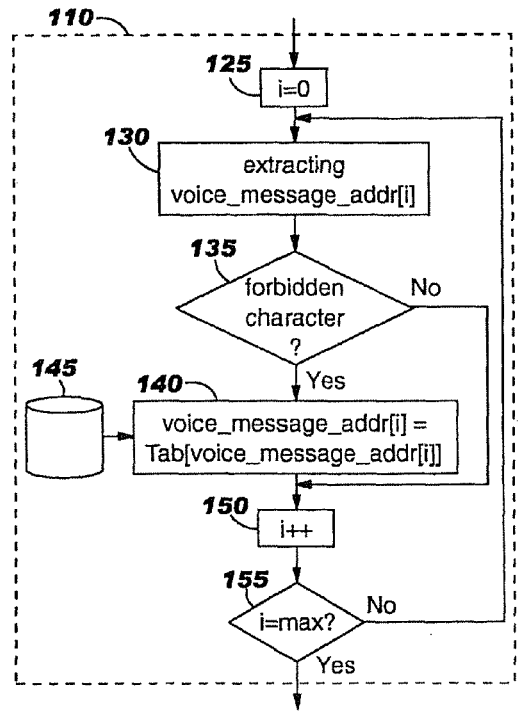
FIG. 2 is a flowchart which illustrates in more detail an encoding step 110 of the program of FIG. 1.

The present invention will now be described in detail with reference to the figures. FIGS. 1 and 2 illustrate a voice or audio message address encoding program 90 to merge an address of a voice message with an original name of a file 170 (described by the voice message). The file may be attached to an e-mail sent by a sender from a sender computer 300, and received by a mail server 315 via the Internet 305 en route to a recipient computer 310 via the Internet. The program 90 can reside in the sender computer 300 which includes a CPU 10, operating system 12, RAM 14, ROM 16, disk storage 18 and TCP/IP card 20 to interface the sender computer 300 to Internet 305, as illustrated in FIG. 5. A related voice or audio message address decoding program 190 can reside in the recipient computer 310 which includes a CPU 30, operating system 32, RAM 34, ROM 36, disk storage 38, web browser 42 and TCP/IP card 40 to interface the sender computer 300 to Internet 305, as illustrated in FIG. 5. As shown in FIG. 1, program 90 extracts or reads the original name of the file 170 selected by the user/sender for inclusion in the e-mail (step 100). Typically, the original or primary name indicates the general subject or title of the file, and possibly the author of the file (but not the address of the associated voice message). The user/sender can also record an audio message file and send it to the voice server 205 for storage. The voice server 205 will return to computer 300 the URL address of the audio message file associated with the file (step 105). The voice message provides a summary or description of the file and can also be used to verify the origin of the file. Then, program 90 encodes or modifies the voice message address, if needed to comply with file naming rules of the recipient computer (step 110), and merges the encoded or modified voice message address with the primary filename of the file, using predetermined separators (step 115). The "separators" can be parenthesis. Program 90 then renames the file, as it appears in the e-mail as an icon/attachment, with the merged primary filename and the encoded or modified voice message address (step 120).

FIG. 2 provides more detail of the foregoing modifying or encoding step 110. Program 90 sets a variable "i" to "zero" (step 125) and extracts the i$^{th}$ character from the voice message address string (step 130). Then, program 90 performs a test to determine whether the extracted character is valid or otherwise forbidden by file naming, for example, syntax, rules imposed by the file system of the recipient's computer (step 135). If the extracted character is a valid character under the file naming rules, variable "i" is incremented by one (step 150) and program 90 performs a test to determine if variable "i" has reached its maximum value that is, if all characters of the voice message address string have already been processed (step 155). If variable "i" has not yet reached its maximum value, program 90 repeats the last four steps of the algorithm (steps 130 to 150). Otherwise, if variable "i" has reached its maximum value, the process is stopped. If the character extracted from the voice message address string is forbidden by the file naming, for example, syntax, rules, program 90 selects a corresponding valid character, or group of characters, in a lexicography table 145. Then, program 90 replaces the invalid character with the corresponding, valid character, or group of characters (step 140). Then, program 90 increments variable "i" by one and performs the same test described above to determine if variable "i" has reached its maximum value.

As an example of use of program 90, consider the case of an image file attachment with original or primary name "Berry-January.jpg". In this example, the image file has JPEG format. (However, the present invention is useful with other types of files such as text files.) A sender would like to send this image file to a recipient as an e-mail attachment with the voice message address merged with the original or primary file name, with modification or encoding of the voice message address as needed to comply with the recipient's file naming rules. In this example, the lexicography table 145 modifies or encodes the voice message address as follows:

":" modified or encoded to ".."

"/" modified of encoded to "("

After the e-mail is received by the recipient, the recipient can obtain an audio summary or description of this file and/or verify the origin of this file, by playing the voice message corresponding to this file. For sake of illustration, the recipient can download the voice message from the following URL:

http://www.messagebay.com/messages/987654321.wav

When the originator of the document "Berry-January.jpg" saves or sends the document, an option such as "Copy path to file" can be selected to encode in the name of the document the URL (or other address) of the voice message. The voice message provides a summary or description of the file and/or verifies the origin of the file. If this option is selected, program 90 modifies the filename according to the algorithm of FIGS. 1 and 2. By using the lexicography table 145, program 90 modifies or encodes the voice message URL address as follows:

http.((www.messagebay.com(messages(987654321.wav

Then, program 90 merges the encoded URL with the original or primary filename. In this example, the encoded URL is enclosed by separators in the form of parenthesis. The encoded URL is inserted in front of the extension dot of the primary filename and before the ".jpg" as follows:

Berry-January(http.((www.messagebay.com(messages (987654321.wav).jpg

Then, program 90 renames the file in the e-mail to this modified filename.

However, it should be understood that the audio message address can be merged in other ways with the file name. For example, program 90 can alternately replace a sequence of forbidden characters by a single one, for example, replacing "//:" by "(". Also, program 90 may replace some sets of characters with more compact codes, for example, replacing "http://" by "H!".)

Figure 3:
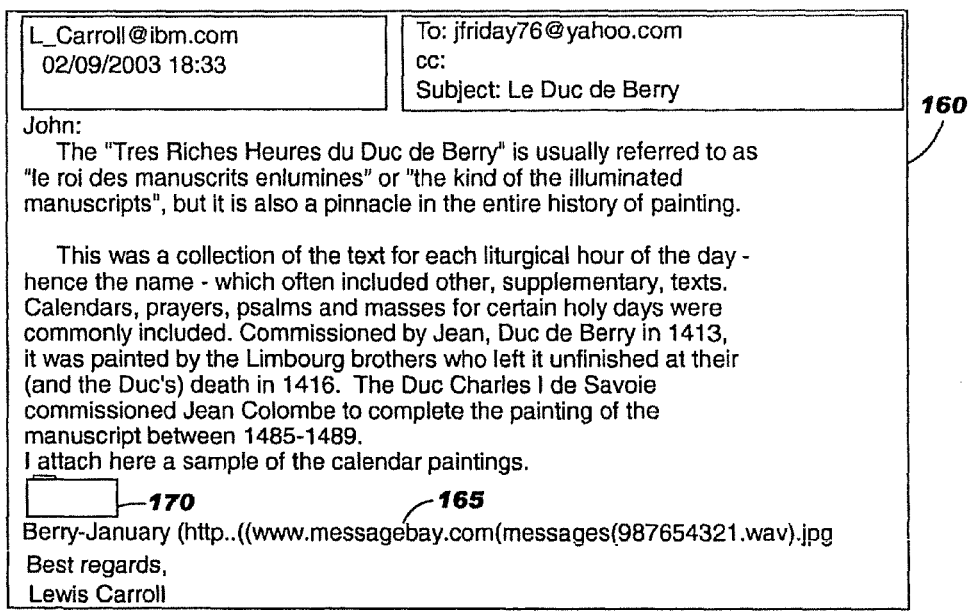
FIG. 3 illustrates an e-mail with an attachment named by the program of FIG. 1, according to the present invention.

FIG. 3 depicts an e-mail 160 where the original name of attachment file 170 is "Berry-January" and the syntax transformed URL 165 of the voice message address is "http.(www.messagebay.com(messages(987654321.wav). The composite filename includes the original file name merged with the URL 165 of the voice message address in parenthesis, according to the algorithm of FIG. 1.

After receipt of the e-mail 160 with the file attachment 170, the recipient can select to hear the voice message and thereby obtain a summary or a description of the attached file and/or verify the origin of the attached file. The recipient selects to hear the voice message by selecting an option presented by the recipient's audio message handling program 190. In such a case, the recipient's program 190 will extract the voice message address from the composite file name (i.e. original or primary file name merged with the modified or encoded voice message address). Then, the recipient's program 190 will request the recipient's web browser 42 to fetch the voice message from the specified address and upon receipt, play the voice message to the recipient. The recipient's program 190 uses the same table 145 of lexicographic transformations as the one used by the sender program 90 to extract the real voice message address or URL from the composite file name. To that end, certain symbols or groups of symbols of the modified or encoded URL are replaced by symbols or characters that are compatible with URL conventions on the Internet, to request the voice message from the real URL. Using the same example as before, the decoded voice message address is as follows:

http://www.messagebay.com/messages/987654321.wav

Steps 200, 215, 220 and 225 of FIG. 4 illustrate an example of the sender's program 90 encoding the voice message address in the filename of the corresponding, attached file. Steps 230, 235, 240, 245, 250, 255 and 260 of FIG. 4 illustrate an example of the recipient's program 190 and the recipient's web browser program 42 to subsequently extract the voice message address and fetch the voice message file via the Internet. The voice message summarizes or describes the attached file and/or verifies the origin of the attached file, respectively.

When a user at computer 300 saves a file, or if a voice message has not already been associated with a file that has already been saved, and the user wants to send the file attached to an e-mail, the user can invoke program 90 and record a voice message briefly describing the content of the file or characterising the file (step 200). Using program 90, the user/sender then sends the voice message (as an attachment to an e-mail) to a voice server 205 where it is stored as a file in a database 210 of the voice server in association with a URL. The URL which includes the address of voice server 205 and this voice message file. The voice server 205 returns to the program 90 of user/sender computer 300 the voice message address or URL associated with this voice message (step 215). Then, program 90 within the user/sender's computer 300 modifies or encodes this voice message address (step 220), merges it with the original or primary file name and renames the file attachment 170 with the composite file name according to the algorithm described by reference to FIGS. 1, 2 and 3 (step 225). Next, the user sends the e-mail with the renamed file attachment to the recipient via a mail server 315 (shown in FIG. 5).

After receiving an e-mail with the attachment file and the composite name that contains an encoded voice message address, upon request of the recipient to program 190 in computer 310, program 190 extracts and decodes the voice message address (step 230) as described above. Optionally, the recipient can set a parameter of the recipient program 190 to automatically request the voice message address extraction and decoding whenever a voice message address is contained in the file name of an attachment. Then, the program 190 directs the web browser 42 to send a request (including the voice message address) over the Internet to fetch the audio file at the voice message address (step 235). In the illustrated example, this request is sent to voice server 205 which returns the voice message file. After receiving the voice message file (step 240) (if optional steps 245 and 250 are not used), the user can check the content and origin of the file, before opening the file attachment, by listening to and analysing the received voice message (step 255) and then decide whether to open the file attachment (step 260).

The following is a description of optional steps 250 and 255. Voice analysis, based on voice prints, can also be incorporated into the present invention to verify the author (or originator) of the voice message. A voiceprint is a set of measurable characteristics of a human voice that uniquely identifies an individual. These characteristics are based on the physical configuration of a speaker's mouth and throat and can be expressed as a mathematical formula. A voiceprint applies to a vocal sample recorded for that purpose, the derived mathematical formula, and its graphical representation. Voiceprints are currently used in known voice authentication systems, or Voice ID systems, for user authentication.

Known voice ID is a type of user authentication that uses voiceprints and pattern recognition software to verify a speaker. An adaptation of biometrics, voice ID relies on the fact that vocal characteristics, like fingerprints and patterns of people's irises, are unique for each individual. The criteria on which a voice ID system bases decisions are created by the shape of the speaker's mouth and throat, rather than more variable conditions. Because of the relative permanence of the characteristics it measures, the technology is not easily fooled by an attempt to disguise a voice, and is not generally affected by changes that can make a voice sound quite different to the human ear, such as a bad cold or extreme emotion. During enrollment for a voice authentication system, a user's voice is recorded, creating what is called a voiceprint for comparison with samples taken for user identification. To foil attempts to fool the system with a prerecorded voice sample, people may be asked to read or repeat a list of words in random combinations. Voice ID systems have been used in a variety of known security-related applications. Voice authentication products are currently available from a number of vendors.

Known voice biometrics programs create a voice print of the user i.e., a template of the person's unique voice characteristics created when the user enrolls with the system. All subsequent attempts to identify the user require the user to speak, so that their live voice sample may be compared against the prerecorded template. For example, U.S. Pat. No. 6,529,871 by Kanevsky et al. issued to IBM Corporation, entitled "Apparatus and method for speaker verification, identification, classification employing non-acoustic and/or acoustic models and databases" describes such a system.

The known voice biometrics programs can be performed at the recipient's computer, an authentication server (not shown) or voice server 205 automatically or upon request by the recipient, to determine the authenticity of the fetched audio message. To be performed at the recipient's computer, the voice message stored in voice server 205 is associated with downloading parameters corresponding to a voice authentication function and voice print for the audio message file. Thus, when the recipient requests the audio message file from the voice server, the voice server will download not only the voice message file but also the voice authentication function and voice print to allow the recipient computer to perform the voice comparison. Alternately, when the recipient requests the audio message file from the voice server, the voice server will automatically perform the voice comparison, and notify the recipient of the outcome.

Thus, the received voice message can be analysed to extract voice characteristics. Then, the voice characteristics are compared to prerecorded voice characteristics of the assumed sender, stored on a secure server e.g., a server owned by an authentication authority. Thus, step 245 can be included in the verification process in which the voice biometrics program verifies the origin of the audio message file associated with the attached file before the recipient opens the attached file.

If step 245 is included in the verification process, and the voice biometrics program confirms the origin of the attachment file (decision 250, yes branch), then the recipient's program 190 instructs the web browser 42 to play the voice message for the recipient (step 255). Based on the content of the e-mail and voice message and voice print authentication of the voice message, if any, the recipient can decide whether to immediately discard the e-mail and file attachment, whether to open the file attachment or whether to retain the e-mail with the file attachment to open later.

FIG. 5 depicts an example of a distributed computing environment which includes the present invention. For sake of illustration, the main steps of programs 90 and 190 described in FIG. 4 are illustrated with flow diagram arrows in FIG. 5. (Programs 90 and 190 can be loaded into their respective computers 300 and 310 from a computer storage medium such as a magnetic disk, CD ROM, DVD, etc. or downloaded from the Internet via respective TCP/IP adapter cards 20 and 40.) As described above, a user/sender computer 300 is connected to a network 305 such as the Internet, allowing transmission of files as attachments to e-mails or separately. Preferably, a voice server 205 comprising a data base 210 is also connected to network 305 to store the voice messages associated with the transmitted files. When user 300 wants to transmit a file according to the present invention, the user records a voice message summarizing or describing the content of the file. The user then sends the voice message as a file to the voice server 205 and the voice server stores the voice message file and associates it with a URL or other address. The voice server 205 returns the address of the voice message file, and program 90 within the user computer 300 encodes the voice message address and merges it with the original or primary file name of this file according to the algorithms described above. When a recipient at computer 310 receives an e-mail or a message containing this attached file from the user/sender via network 305 and a mail server 315, as illustrated by dotted arrows, the recipient analyzes the filename of the received file to determine whether or not it contains an encoded voice message address. If it contains an encoded voice message address, the recipient requests the recipient computer 310 to extract and decode the voice message address from the composite file name and obtain the voice message stored in the database 210 of the voice server 205 via the network 305.

In another embodiment of the present invention, some characteristics of the sender or author of the attached file are stored in conjunction with the voice message. For example, an electronic address of the sender or the author of the attached file can be associated with the voice message, allowing the recipient to contact him or her if needed. Also, several links to associated documents can be associated with the voice message, allowing the receiver to get further information on the subject of the attachment file before opening it. Also, the voice message can be associated with a URL or the voice authentication function on the voice server. Alternately, the voice message can be associated with downloading parameters to allow the recipient to download a voice authentication function and voice print for the audio message file. The voice authentication function will check the authenticity/origin of the audio message file by comparing some characteristics of the voice message with prerecorded characteristics of the presumed sender or author of this document.

The invention claimed is:

1. A method of managing a first file attached to an e-mail, the first file having a file name, the method comprising the steps of:

a first computer determining the file name of the first file attached to the e-mail, the e-mail being addressed to a recipient utilizing a second computer;

the first computer sending a second file including a voice message to a third computer, the voice message including a description of contents of the first file;

responsive to the first computer sending the second file to the third computer, the first computer receiving from the third computer an address of the second file, the address indicating a location at which the second file is stored;

the first computer modifying the address of the second file to comply with a set of rules for naming files in a file system of the second computer;

the first computer modifying the file name of the first file attached to the e-mail by enclosing the modified address between a first delimiter and a second delimiter and inserting the enclosed modified address into the file name, the first file having remained attached to the e-mail from the step of determining the file name up to and including the step of modifying the file name; and the first computer sending to the second computer the e-mail with the modified file name to indicate to the recipient that the first file is associated with the voice message.

2. The method of claim 1, wherein the step of inserting the enclosed modified address into the file name includes inserting the enclosed modified address in front of an extension dot of the file name.

3. The method of claim 1, wherein the address of the second file includes a Uniform Resource Locator (URL) of the second file, and wherein the step of modifying the address of the second file includes modifying the URL by:

replacing a colon character in the URL with a first set of one or more replacement characters, and replacing a forward slash character in the URL with a second set of one or more replacement characters, wherein the first set of one or more replacement characters is different from the second set of one or more replacement characters, and wherein the enclosed modified address includes the first set of one or more replacement characters and the second set of one or more replacement characters.

4. The method of claim 1, wherein the address of the second file includes a Uniform Resource Locator (URL) of the second file, wherein the step of modifying the address of the second file includes modifying the URL by replacing a set of characters in the URL with one or more replacement characters, wherein the set of characters includes a sequence of three characters ://, and wherein the enclosed modified address includes the one or more replacement characters.

5. The method of claim 1, wherein the voice message further includes an indication of an author or an originator of the first file.

6. The method of claim 1, wherein the step of sending the e-mail with the modified file name includes sending the e-mail with an icon adjacent to the modified file name, and wherein the modified file name and adjacent icon indicate the first file is an attachment to the e-mail.

7. A computing system comprising a processor, a computer-readable, tangible storage device, a computer-readable memory unit, and a software application stored in the computer-readable, tangible storage device, the software application comprising instructions when executed by the processor via the memory unit implement the method of claim 1.

8. A computer program product, comprising:

a computer-readable, tangible storage device and computer-readable program code stored on the computer-readable, tangible storage device, the computer-readable program code when executed by a central processing unit (CPU) of a first computer implementing a method of managing a first file attached to an e-mail, the first file having a file name, the method comprising the steps of:

determining the file name of the first file attached to the e-mail, the e-mail being addressed to a recipient utilizing a second computer;

sending a second file including a voice message to a third computer, the voice message including a description of contents of the first file;

responsive to sending the second file to the third computer, receiving from the third computer an address of the second file, the address indicating a location at which the second file is stored;

modifying the address of the second file to comply with a set of rules for naming files in a file system of the second computer;

modifying the file name of the first file attached to the e-mail by enclosing the modified address between a first delimiter and a second delimiter and inserting the enclosed modified address into the file name, the first file having remained attached to the e-mail from the step of determining the file name up to and including the step of modifying the file name; and sending to the second computer the e-mail with the modified file name to indicate to the recipient that the first file is associated with the voice message.

9. The program product of claim 8, wherein the step of inserting the enclosed modified address into the file name includes inserting the enclosed modified address in front of an extension dot of the file name.

10. The program product of claim 8, wherein the address of the second file includes a Uniform Resource Locator (URL) of the second file, and wherein the step of modifying the address of the second file includes modifying the URL by:

replacing a colon character in the URL with a first set of one or more replacement characters, and replacing a forward slash character in the URL with a second set of one or more replacement characters, wherein the first set of one or more replacement characters is different from the second set of one or more replacement characters, and wherein the enclosed modified address includes the first set of one or more replacement characters and the second set of one or more replacement characters.

11. A method of authenticating a first file attached to an e-mail, the method comprising the steps of:

a computer receiving the e-mail with the first file attached thereto, wherein the e-mail includes a modified file name of the first file, the modified file name including an original file name of the first file and an encoded address of a second file inserted into the original file name, the modified file name further including a first delimiter and a second delimiter enclosing the encoded address, the first file having remained attached to the e-mail from a determination of the original file name up to and including a generation of the modified file name, wherein the encoded address is a string of characters that complies with a set of rules for naming files in a file system of the computer;

the computer extracting the encoded address from the modified file name;

the computer decoding the encoded address to identify an address of a second file including a voice message, the voice message including a description of contents of the first file;

the computer sending a request to fetch the second file from a computing data storage device, wherein the request includes the identified address of the second file;

responsive to the step of sending the request to fetch the second file, the computer receiving the second file; and the computer sending to a recipient of the e-mail, the voice message included in the second file.

12. The method of claim 11, further comprising the steps of:

prior to any access of the first file by the recipient, the computer verifying that the voice message includes a voice of a sender of the e-mail based on a voice signature of the sender; and based on the verified voice message, the computer initiating a display of the first file.

13. The method of claim 12, wherein the step of verifying includes:

the computer downloading a voice authentication program and the voice signature of the sender; and the computer executing the voice authentication program to compare characteristics of the voice included in the voice message to the voice signature.

14. The method of claim 11, wherein the step of decoding the encoded address includes:

the computer determining a first set of one or more characters in the encoded address is associated with a second set of one or more characters included in the address of the second file based on a table of lexicographic transformations; and in response to the step of determining the first set of one or more characters in the encoded address is associated with the second set of one or more characters, the computer replacing the first set of one or more characters in the encoded address with the second set of one or more characters included in the address of the second file, wherein the first set of one or more characters complies with a set of rules for naming files in a file system of the computer, and wherein the second set of one or more characters does not comply with the set of rules for naming files.

15. The method of claim 14, wherein the second set of one or more characters complies with a set of rules for naming a Uniform Resource Locator address.

16. The method of claim 11, further comprising the step of the computer determining the encoded address is included in the modified file name, wherein the step of extracting is performed automatically in response to the step of determining the encoded address is included in the modified file name.

17. A computing system comprising a processor, a computer-readable, tangible storage device, a computer-readable memory unit, and a software application stored in the computer-readable, tangible storage device, the software application comprising instructions when executed by the processor via the memory unit implement the method of claim 11.

18. A computer program product, comprising:

a computer-readable, tangible storage device having a computer-readable program code stored therein, the computer-readable program code containing instructions that are carried out by a processor of a computer system to implement the method of claim 11.

* * * * *